Patented Dec. 27, 1927.

1,654,404

UNITED STATES PATENT OFFICE.

HENRY BLUMENBERG, JR., OF MOAPA, NEVADA, ASSIGNOR TO STOCKHOLDERS SYNDICATE, OF LOS ANGELES, CALIFORNIA, A CORPORATION OF CALIFORNIA.

ACID METAL PHOSPHATE AND PROCESS OF MAKING SAME.

No Drawing. Application filed December 23, 1924. Serial No. 757,767.

My invention relates to an acid metal phosphate and a process of making the same.

It is an object of this invention to compound an acid metal phosphate which may be substituted for boric acid or other boron compounds as one of the ingredients in lower melting enamel compounds. The enamel produced by substituting the acid metal phosphate for the boron compounds just referred to has superior qualities as to the expansion, coefficient, density, brilliancy, durability and economy.

Large quantities of phosphoric acid are now being produced at the various smelters as a by-product from the condensed sulphuric acid fumes, which are now being used to convert crude phosphate of lime rock into soluble phosphoric acid.

At the present time the production of phosphoric acid is far greater than the demand, resulting in low prices therefor. Phosphoric acid, when dehydrated by heating to a glassy mass, absorbs water very rapidly and becomes viscous, making it inconvenient to handle and transport.

My invention contemplates the conversion of phosphoric acid combined with a metal base and dehydrated to a glassy mass so as to form a solid solution unaffected by moisture which may be crushed to any desirable mesh and which can be easily transported.

My invention consists of the composition of matter and the process of making the same, as hereinafter described and claimed.

I take a metal base, or a metal salt, such as lead oxide or potassium carbonate, or a mixture of the two, and add the same to phosphoric acid, the latter being greatly in excess of the amount necessary to form lead phosphate or potassium phosphate. The resulting mixture is very viscous, but by heating the same to fusion, the temperature required varying from 400° to 700° C., depending solely on the nature of the metal or metal bases used, a metal phosphate glass is produced which may be ground to any desired fineness. This metal phosphate glass may be used as one of the ingredients in enamel or ceramic glaze compositions where a low fusing point is desired.

In making the metal phosphate glass, as just described, it is desirable to combine as much phosphoric acid as possible with the metal base. The resulting product, it will be understood, is not a definite chemical compound, but a solid solution in which the acid metal phosphate forms a mixture of the following assumed acid phosphates: Tetra, penta, octo, deca, or tetra, kaideca, meta phosphates. The ratio of the phosphoric acid radicles may vary from four to fourteen to one metal base radicle.

The bases of the following metals or salts containing them can be used as a carrier or conveyor for the phosphoric acid, namely, lead, tin, aluminum, zinc, barium, magnesium, lithium, calcium, strontium, potassium, sodium or a combination of them. All of them form fairly stable glasses mostly transparent when fused with phosphoric acid in excess, as above described.

Various changes in the steps of the process may be made by those skilled in the art without departing from the spirit of my invention, as claimed.

I claim:

1. An acid metal phosphate glass comprising a metal base fused with phosphoric acid in which the phosphoric acid radicles are contained in the ratio of four to fourteen phosphoric acid radicles to one metal base radicle.

2. An acid metal phosphate glass comprising a lead base fused with phosphoric acid in which the phosphoric acid radicles are contained in the ratio of four to fourteen phosphoric acid radicles to one metal base radicle.

3. A process of making an acid metal phosphate glass comprising mixing a metal base with phosphoric acid, in which the phosphoric acid is taken in excess so that there are from four to fourteen phosphoric acid radicles to one of the metal base, and fusing the same at a temperature ranging from 400 degrees to 700 degrees C.

In testimony whereof I have signed my name to this specification.

HENRY BLUMENBERG, JR.